(12) United States Patent
Faruque et al.

(10) Patent No.: US 11,548,464 B1
(45) Date of Patent: Jan. 10, 2023

(54) SEATBACK SUPPORTED AIRBAGS RELEASABLY CONNECTED BY A ZIPPER

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/749,219

(22) Filed: May 20, 2022

(51) Int. Cl.
*B60R 21/207* (2006.01)
*B60R 21/233* (2006.01)
*B60R 21/217* (2011.01)
*B60R 21/231* (2011.01)

(52) U.S. Cl.
CPC .......... *B60R 21/207* (2013.01); *B60R 21/217* (2013.01); *B60R 21/233* (2013.01); *B60R 2021/23107* (2013.01)

(58) Field of Classification Search
None
See application file for complete search history.

(56) References Cited

U.S. PATENT DOCUMENTS

| 10,173,629 | B2 | 1/2019 | Barbat et al. |
| 10,189,431 | B2 | 1/2019 | Yamamoto et al. |
| 11,279,309 | B2* | 3/2022 | Kromm ............... B60R 21/2176 |
| 2005/0258624 | A1* | 11/2005 | Abraham .............. B60R 21/207 |
| | | | 280/730.2 |

FOREIGN PATENT DOCUMENTS

| CN | 101247975 A * | 8/2008 | ........... B60R 21/233 |
| DE | 102012018114 A1 | 3/2013 | |
| DE | 102020104215 A1 * | 8/2021 | |
| EP | 3696028 A1 | 8/2020 | |

* cited by examiner

*Primary Examiner* — Faye M Fleming
(74) *Attorney, Agent, or Firm* — Frank A. MacKenzie; Bejin Bieneman PLC

(57) ABSTRACT

An assembly includes a seat. The assembly includes a first airbag and a second airbag each supported by the seat and inflatable to an inflated position. The assembly includes a zipper connecting the first airbag to the second airbag in the inflated position. The assembly includes a non-inflatable panel connected to the first airbag and the second airbag. The non-inflatable panel has a releasable fastener releasably connected to one of the first airbag or the second airbag.

20 Claims, 6 Drawing Sheets

SEATBACK SUPPORTED AIRBAGS RELEASABLY CONNECTED BY A ZIPPER

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
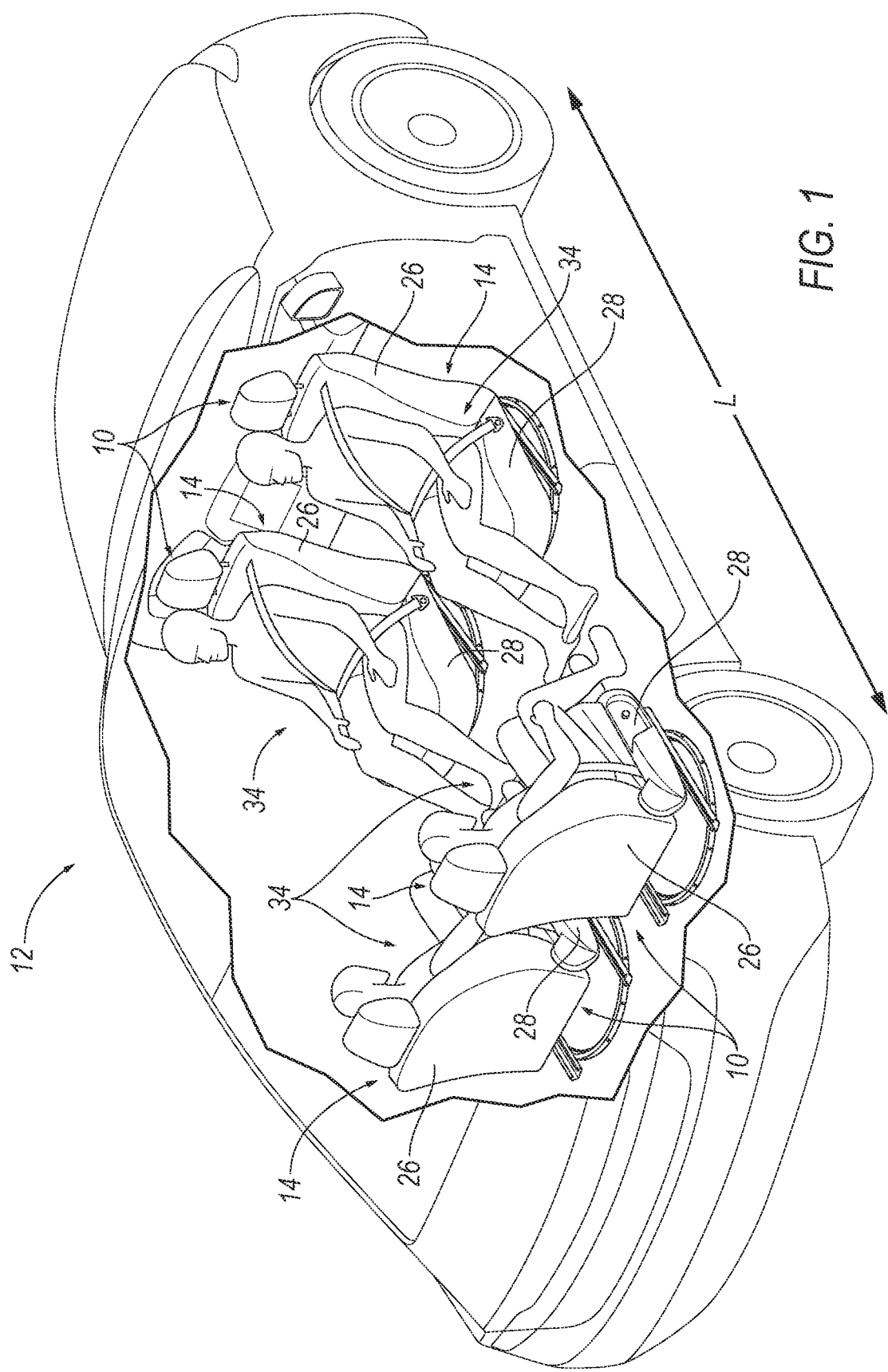
FIG. 1 is a perspective view of a vehicle have a plurality of seats each having an airbag assemblies supported by seatbacks of the seats.

An assembly includes a seat. The assembly includes a first airbag and a second airbag each supported by the seat and inflatable to an inflated position. The assembly includes a zipper releasably connecting the first airbag to the second airbag in the inflated position. The assembly includes a non-inflatable panel connected to the first airbag and the second airbag. The non-inflatable panel has a releasable fastener releasably connected to one of the first airbag or the second airbag.

The first airbag and the second airbag may each extend from the seat to a distal edge, the zipper connecting the distal edge of the first airbag to the distal edge of the second airbag.

The zipper may include a first row of teeth extending along the distal edge of the first airbag and a second row of teeth extending along the distal edge of the second airbag, the first row of teeth being engageable with the second row of teeth.

The first row of teeth may engage with the second row of teeth when the first airbag and the second airbag are in the inflated position.

The zipper may extend along the distal edges of the first airbag and the second airbag.

The first airbag and the second airbag may extend between the zipper and the non-inflatable panel.

The seat may include a seatback defining an occupant seating area, the first airbag and the second airbag surrounding the occupant seating area in the inflated position.

The occupant seating area may be between the zipper and the seatback.

The first airbag and the second airbag may include a bottom surface extending from the seatback and around the occupant seating area, the zipper extending from the seatback to the bottom surface.

The first airbag and the second airbag may each extend from the seatback and converge to a gap, the zipper extending along the gap.

The zipper may include a zipper pull movable along the first airbag and the second airbag, the zipper pull being spaced from the seatback when the first airbag and the second airbag are in the inflated position.

The zipper pull may be seat-forward of the seatback when the first airbag and the second airbag are in the inflated position.

The non-inflatable panel and the zipper may extend along a cross-seat midline when the first airbag and the second airbag are in the inflated position.

The first airbag and the second airbag may each include an outer panel and an inner panel between the outer panel and the seat, the non-inflatable panel being connected to the inner panels of the first airbag and the second airbag and the zipper extending along the outer panels of the first airbag and the second airbag.

The releasable fastener may include hook and loop fasteners.

The non-inflatable panel may include a second releasable fastener releasably connected to the other of the first airbag or the second airbag.

The non-inflatable panel may be connected to the first airbag and the second airbag by a stitch.

The assembly may include a hook supported by one of the first airbag and the second airbag and a ring supported by the other of the first airbag and the second airbag, the hook being releasably engageable with the ring.

The hook and the ring may be between the non-inflatable panel and the first airbag and the second airbag.

The hook and the ring may be between the zipper and the non-inflatable panel.

With reference to the Figures, wherein like numerals indicate like parts throughout the several views, an assembly 10 for a vehicle 12 includes a seat 14. The assembly 10 includes a first airbag 16 and a second airbag 18 each supported by the seat 14 and inflatable to an inflated position. The assembly 10 includes a zipper 20 connecting the first airbag 16 to the second airbag 18 in the inflated position. The assembly 10 includes a non-inflatable panel 22 connected to the first airbag 16 and the second airbag 18. The non-inflatable panel 22 has a releasable fastener 24 releasably connected to one of the first airbag 16 or the second airbag 18.

In the event of an impact to the vehicle 12, the airbags 16, 18 may inflate to the inflated position. The airbag may control the kinematics of an occupant of the seat 14 in the event of an impact to the vehicle 12. The zipper 20 connects to the first airbag 16 to the second airbag 18 to surround an occupant in the seat 14. The non-inflatable panel 22 may be between the occupant and the zipper 20 to limit contact between the occupant and the zipper 20 in the event of an impact. Once the impact is complete, the zipper 20 may be moved to disconnect the first airbag 16 from the second airbag 18 to allow the occupant to exit the seat 14 of the vehicle 12. The occupant may move the non-inflatable panel 22 by releasing the releasable fastener 24 to reach the zipper 20. The occupant may then move the zipper 20 to disconnect the first airbag 16 from the second airbag 18 to allow the occupant to exit the seat 14.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor (not numbered), vehicle roof (not numbered), etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 may include one or more seats 14. Specifically, the vehicle 12 may include any suitable number of seats 14. The seats 14 are supported by the vehicle floor (not numbered). The seats 14 may be arranged in any suitable arrangement in the passenger compartment. One or more of the seats 14 may be at the front end of the passenger compartment, e.g., a driver seat and/or a passenger seat. In other examples, one or more of the seats 14 may be behind the front end of the passenger compartment, e.g., at the rear end of the passenger compartment. The seats 14 may be movable relative to the vehicle floor to various positions, e.g., movable fore-and-aft and/or cross-vehicle. The seat 14 may be of any suitable type, e.g., a bucket seat.

The seats 14 include a seatback 26, a seat bottom 28, and a head restraint (not numbered). The head restraint may be supported by and extending upwardly from the seatback 26. The head restraint may be stationary or movable relative to the seatback 26. The seatback 26 may be supported by the seat bottom 28 and may be stationary or movable relative to the seat bottom 28. The seatback 26 may extend from an upper end to a lower end. The lower end may be connected to the seat bottom 28. The upper end of the seatback 26 may be spaced upwardly from the lower end of the seatback 26, i.e., upwardly from the seat bottom 28. The seatback 26, the seat bottom 28, and the head restraint may be adjustable in multiple degrees of freedom. Specifically, the seatback 26, the seat bottom 28, and the head restraint may themselves be adjustable. In other words, adjustable components within the seatback 26, the seat bottom 28, and the head restraint may be adjustable relative to each other.

Figure 2:
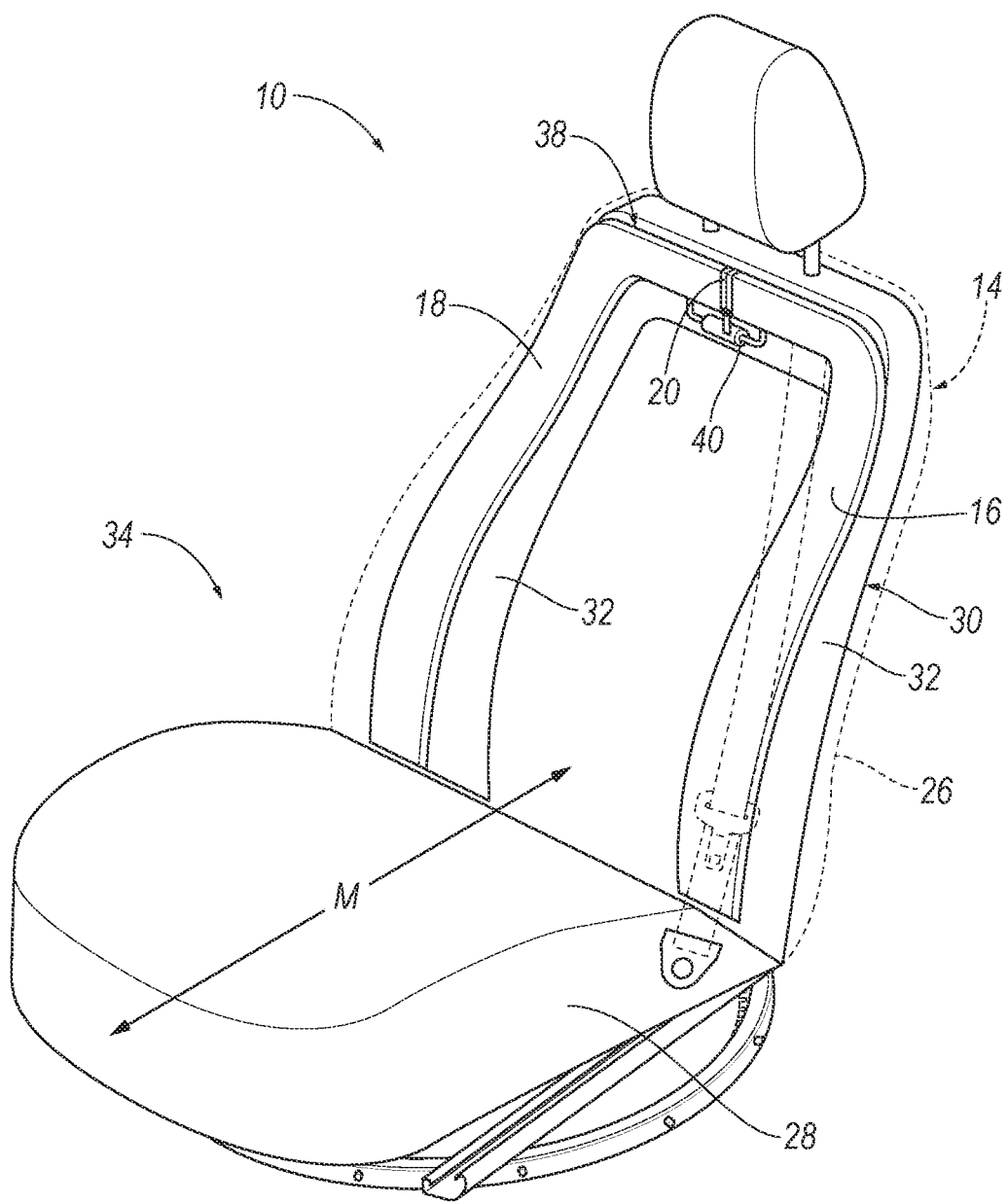
FIG. 2 is a perspective view of one of the seats of FIG. 1.

With reference to FIG. 2, the seatback 26 includes a frame 30 and a covering (not numbered) supported on the frame 30. The frame 30 may include tubes, beams, etc. Specifically, the frame 30 includes a pair of upright frame members 32. The upright frame members 32 are elongated, and specifically, are elongated in a generally upright direction when the seatback 26 is in a generally upright position. The upright frame members 32 are spaced from each other and the frame 30 includes one or move cross-members (not numbered) extending between the upright frame members 32. The frame 30, including the upright frame members 32, may be of any suitable plastic material, e.g., carbon fiber reinforced plastic (CFRP), glass fiber-reinforced semi-finished thermoplastic composite (organosheet), etc. As another example, some or all components of the frame 30 may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the frame 30. The padding may be between the covering and the frame 30 and may be foam or any other suitable material.

Each seat 14 may rotate about an axis (not numbered) that extends through the vehicle roof and the vehicle floor. For example, the seats 14 may rotate between a forward-facing position and a rearward-facing position. In the forward-facing position, an occupant of the seat 14 faces the front end of the passenger compartment. In the rearward-facing position, an occupant of the seat 14 faces the rear end of the passenger compartment. The seats 14 may rotate completely, i.e., 360°, about the axis. The seats 14 may rotate between fixed positions, e.g., the forward-facing position and the rearward-facing position, or may be rotatable to an infinite number of positions.

The seat bottom 28 and seatback 26 may define a cross-seat midline M. The cross-seat midline M may extend equidistantly from either side of the seat bottom 28 and the seatback 26. When the seat 14 is in the forward-facing position or the rearward-facing position, the cross-seat midline M may extend along a vehicle-longitudinal axis L, i.e., an axis that extends from the front end of the passenger compartment to the rear end of the passenger compartment. When the seat 14 is in a position offset from the forward-facing position or the rearward-facing position, the cross-seat midline M may be offset from the forward-facing position or the rearward-facing position.

With reference to FIGS. 1-3 and 6, the seatback 26 defines an occupant seating area 34 of the seat 14. The occupant seating area 34 is the area occupied by an occupant when properly seated on the seat bottom 28 and the seatback 26. The occupant seating area 34 is in a seat-forward direction of the seatback 26 and above the seat bottom 28. In the example shown in FIG. 1, the occupant seating area 34 faces the front end of the passenger compartment when the seat 14 is in the forward-facing position and the occupant seating area 34 faces the rear end of the passenger compartment when the seat 14 is in the rearward-facing position.

The seatback 26 may have bolsters 36 on opposite sides of the occupant seating area 34. The bolsters 36 are elongated, and specifically, are elongated in a generally upright direction when the seatback 26 is in a generally upright position. The bolsters 36 define cross-seat boundaries of the seatback 26, i.e., the seatback 26 terminates at the bolsters 36. The bolsters 36 may extend in a seat-forward direction relative to the occupant seating area 34, i.e., on opposite sides of the torso and shoulders of an occupant seated on the seat 14. The extension of the bolsters 36 relative to the occupant seating area 34 may be defined by the upright frame members 32 and/or the covering. The size and shape of both the upright frame members 32 and the covering form the bolsters 36.

One or more of the seats 14 may include an airbag assembly 38. The airbag assembly 38 includes the first airbag 16, the second airbag 18, an inflator 40, and may include a housing (not shown). The vehicle 12 may include any suitable number of airbag assemblies 38. As one example, each of the seats 14 of the vehicle 12 may include one airbag assembly 38. In examples including more than one airbag assembly 38, the airbag assembly 38 may be identical or substantially identical to each other. As shown in FIG. 2, the airbag assembly 38 may extend along the frame 30 of the seat 14 when the airbags 16, 18 are in an uninflated position. Specifically, the airbags 16, 18 may extend along the upright frame members 32 and across an upper cross-member of the frame 30 of the seat 14.

The airbag assembly 38 is supported by the seatback 26. Specifically, the first airbag 16 and the second airbag 18 are each supported by the seat 14, specifically, the seatback 26. The airbag assembly 38, i.e., the first airbag 16 and the second airbag 18, is supported by the frame 30 of the seat 14 at the upper end of the seatback 26. Specifically, the airbag assembly 38 is mounted to the frame 30 of the seatback 26. In other words, the airbag assembly 38 is mounted such that the airbag assembly 38 is stationary relative to the frame 30 of the seatback 26. The airbag assembly 38 may be mounted to the frame 30 of the seatback 26 in any suitable way, e.g., fasteners. The airbag assembly 38 may be concealed by the covering, e.g., the upholstery of the seat 14. In other words, the airbag assembly 38 may be between the frame 30 of the seat 14 and the upholstery of the seat 14. The covering may be releasable along the airbags 16, 18, e.g., the covering may include a tear seam 42 along the frame 30 that is releasable as the airbags 16, 18 move from the uninflated position to the inflated position.

With reference to FIGS. 2-6, the first airbag 16 and the second airbag 18 are each inflatable from the uninflated position to the inflated position. In the inflated position, the first airbag 16 and the second airbag 18 each extend from the seatback 26 of the seat 14 and away from the seatback 26 of the seat 14. Both the first airbag 16 and the second airbag 18 inflate to the inflated position simultaneously, i.e., at the same time. In other words, the first airbag 16 is in the inflated position when the second airbag 18 is in the inflated position and the second airbag 18 is in the inflated position when the first airbag 16 is in the inflated position. The first airbag 16 may extend from one side of the seatback 26 and the second airbag 18 extends from the other side of the seatback 26. Specifically, the first airbag 16 extends from one of the bolsters 36 of the seatback 26 and the second airbag 18 extends from the other of the bolsters 36 of the seatback 26. The airbags 16, 18 extend around the occupant seating area 34 from one bolster 36 to the other bolster 36. Specifically, the airbags 16, 18 may be elongated in a round path from one bolster 36 to the other bolster 36. The airbags 16, 18 may extend in a rounded path from one bolster 36 to the other bolster 36 around the occupant seating area 34. The first airbag 16 and the second airbag 18 encloses the occupant seating area 34 between the airbags 16, 18 and the seatback 26 in the inflated position. Specifically, the airbags 16, 18 surround the occupant seating area 34 when the airbags 16, 18 are in the inflated position. The airbags 16, 18 may surround an occupant seated in the occupant seating area 34 when the airbags 16, 18 are in the inflated position. The first airbag 16 and the second airbag 18 are between the vehicle roof and the occupant seating area 34, i.e., overhead of the occupant in the occupant seating area 34. Accordingly, the airbags 16, 18 control the kinematics of the occupant seated in the seat 14 and may separate the occupant of the seat 14 from other vehicle occupants in the vehicle 12 in the event of the impact.

The first airbag 16 and the second airbag 18 extend from the bolsters 36 of the seatback 26 and converge to a gap 44. Specifically, the first airbag 16 and the second airbag 18 extend from the bolsters 36 of the seatback 26 to distal edges 46 that define the gap 44. The gap 44 extends from the first airbag 16 to the second airbag 18. In other words, the gap 44 extends from the distal edge 46 of the first airbag 16 to the distal edge 46 of the second airbag 18. The gap 44 may extend from the seatback 26 along the cross-seat midline M. In other examples, the gap 44 may be offset from the cross-seat midline M.

The first airbag 16 and the second airbag 18 each extend from the bolster 36 of the seatback 26 to a bottom surface 48. Each of the bottom surfaces 48 extend from the seatback 26 to the distal edge 46 of each of the airbags 16, 18. The bottom surfaces 48 extend around the occupant seating area 34. In other words, the occupant seating area 34 is between the bottom surface 48 and the seatback 26 when the airbags 16, 18 are in the inflated position.

Figure 3:
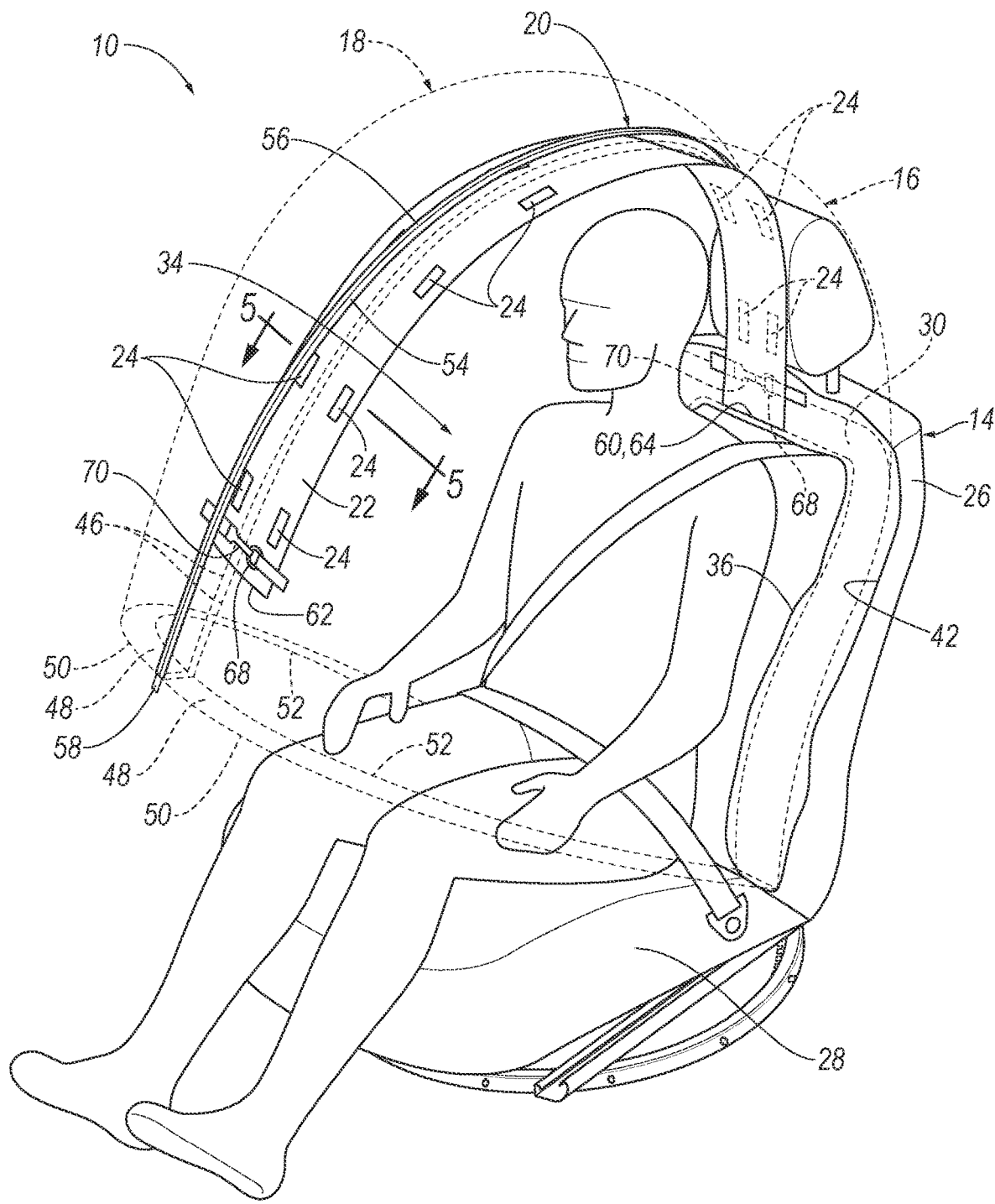
FIG. 3 is a perspective view of the seat with a first airbag and a second airbag in an inflated position with a zipper releasably connecting the first airbag to the second airbag.
Figure 4:
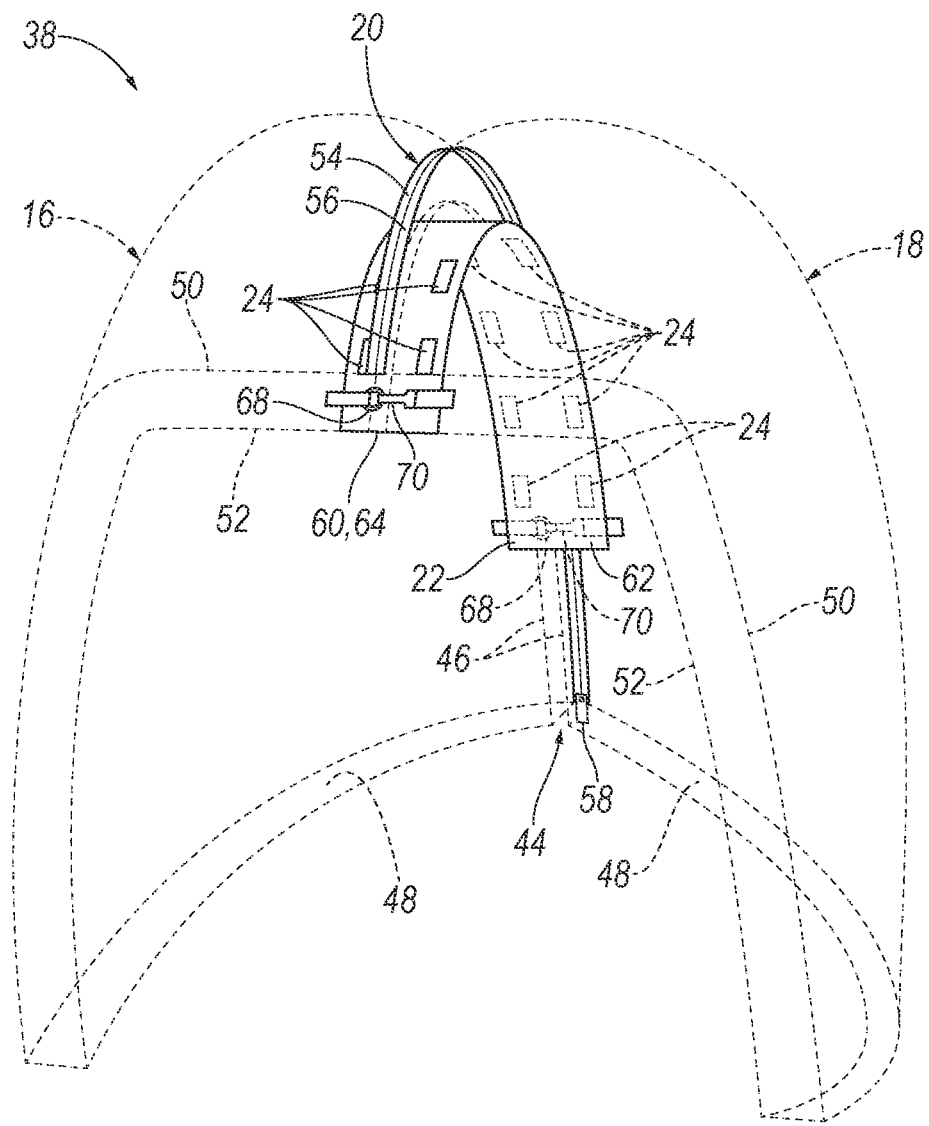
FIG. 4 is a perspective view of the first airbag and the second airbag in the inflated position with a non-inflatable panel connected to the first airbag and the second airbag.
Figure 5:
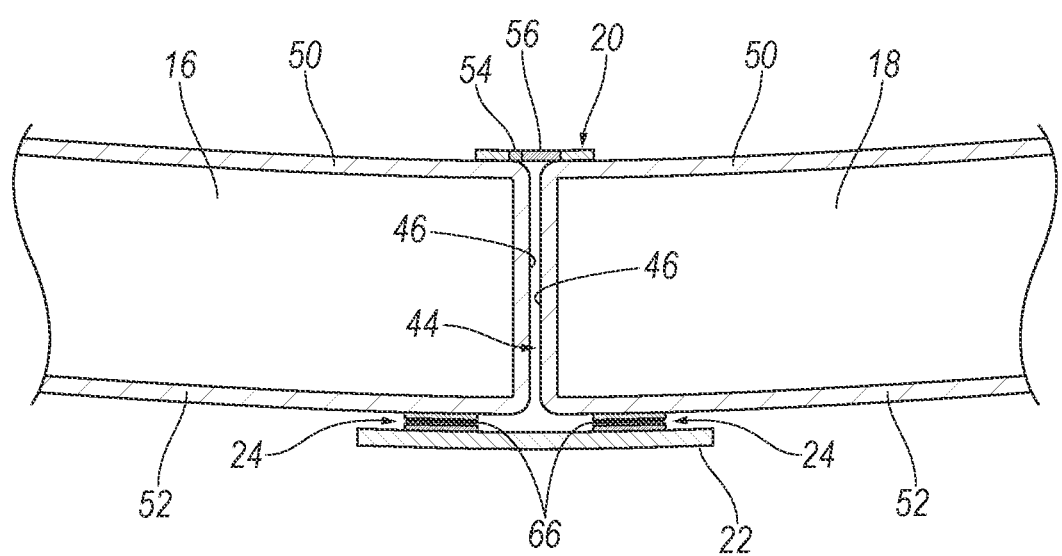
FIG. 5 is a cross-sectional view of the first airbag and the second airbag through Line 5 of FIG. 4.

With reference to FIGS. 3-5, the first airbag 16 and the second airbag 18 may be spaced from each other along part of or all of the gap 44. The first airbag 16 and the second airbag 18 each inflate in a seat-forward direction from the seatback 26 and converge to the gap 44. The seat-forward direction faces the same direction an occupant faces when seated in the seat 14. Specifically, the occupant seating area 34 is in a seat-forward direction of the seatback 26 and above the seat bottom 28. The first airbag 16 and the second airbag 18 inflates away from the seatback 26 in the seat-forward direction.

The first airbag 16 and the second airbag 18 each include an outer panel 50 and an inner panel 52. In the inflated position, the outer panels 50 of each of the airbags 16, 18 faces toward the passenger compartment and the inner panels 52 face toward the seat 14. In other words, the inner panels 52 are between the outer panels 50 and the seat 14. Specifically, the inner panel 52 faces toward the occupant seating area 34 and the occupant seated in the seat 14. In other words, the inner panel 52 is between the occupant and the outer panel 50. The outer panels 50 and the inner panels 52 may extend from the seatback 26, specifically, the bolsters 36 of the seatback 26, to the gap 44 between the first airbag 16 and the second airbag 18. In the event of an impact to the vehicle 12, the occupant of the seat 14 may contact the inner panel 52 and the first airbag 16 and the second airbag 18 may control the kinematics of the occupant.

With reference to FIG. 2, the inflator 40 may be supported by the frame 30 of the seatback 26. Specifically, the inflator 40 may be fixed to the frame 30 of the seatback 26. The inflator 40 is fluidly connected to the first airbag 16 and the second airbag 18. In such an example, the inflator 40 expands the first airbag 16 and the second airbag 18 with inflation medium, such as a gas, to move the airbags 16, 18 from the uninflated position to the inflated position. In other examples, the airbag assembly 38 may include a second inflator 40 (not shown). In such an example, the inflator 40 may be fluidly connected to the first airbag 16 and the second inflator 40 may be fluidly connected to the second airbag 18. The inflator 40 may expand the first airbag 16 to the inflated position and the second inflator 40 may expand the second airbag 18 to the inflated position. The airbag assembly 38 may include any suitable number of inflators 40 to expand the first airbag 16 and the second airbag 18 to the inflated positions. The inflator 40 may be, for example, a pyrotechnic inflator that ignites a chemical reaction to generate the inflation medium, a stored gas inflator that releases (e.g., by a pyrotechnic valve) stored gas as the inflation medium, or a hybrid.

With reference to FIGS. 2-6, the assembly 10 includes the zipper 20 releasably connecting the first airbag 16 to the second airbag 18 in the inflated position. In other words, in the inflated position, the zipper 20 connects to the first airbag 16 to the second airbag 18 around the occupant seating area 34. The zipper 20 may be movable from a zipped position to an unzipped position by an occupant of the seat 14 or another person not seated in the seat 14. When the zipper 20 is in the zipped position, the zipper 20 connects the first airbag 16 to the second airbag 18 and surrounding the occupant seating area 34. When the zipper 20 is in the unzipped position, the first airbag 16 is disconnected from the second airbag 18 and an occupant of the occupant seating area 34 may exit the seat 14. The zipper 20, in the inflated position and zipped position, allows the first airbag 16 and the second airbag 18 to surround the occupant of the seat 14 in the event of an impact.

The zipper 20 extends along the distal edges 46 of the first airbag 16 and the second airbag 18. Specifically, the zipper 20 extends along the gap 44 between the first airbag 16 and the second airbag 18. In other words, the zipper 20 is elongated along the gap 44 between the first airbag 16 and the second airbag 18. The zipper 20 extends from the seat 14, specifically, the seatback 26, to the bottom surface 48 of the first airbag 16 and the second airbag 18. In the example in the Figures, the zipper 20 is elongated along the cross-seat midline M. In other examples, such as where the gap 44 is offset from the cross-seat midline M, the zipper 20 is offset from the cross-seat midline M.

The occupant seating area 34 is between the zipper 20 and the seat 14. In other words, when the airbag is in the inflated position, the occupant seated in the occupant seating area 34 is between the zipper 20 and seatback 26 of the seat 14. The zipper 20 may extend along the outer panels 50 of the first airbag 16 and the second airbag 18. The outer panels 50 may be between the zipper 20 and the inner panels 52 of the airbag. The first airbag 16 and second airbag 18 may be between the zipper 20 and the seat 14 when the airbags 16, 18 are in the inflated position.

The zipper 20 includes a first row of teeth 54, a second row of teeth 56, and a zipper pull 58. Each row of teeth extends along the distal edges 46 of either of the first airbag 16 or the second airbag 18. Specifically, the first row of teeth 54 may extend along the distal edge 46 of the first airbag 16 and the second row of teeth 56 may extend along the distal edge 46 of the second airbag 18. The first row of teeth is engageable with the second row of teeth 56. Specifically, the first row of teeth 54 is engaged with the second row of teeth 56 when the first airbag 16 and the second airbag 18 are in the inflated position and when the zipper 20 is in the zipped position. The first row of teeth 54 is unengaged with the second row of teeth 56 when the zipper 20 is in the unzipped position.

The zipper pull 58 is supported by the first row of teeth 54 and the second row of teeth 56. The zipper pull 58 is movable along the first airbag 16 and the second airbag 18 from the zipped position to the unzipped position. The zipper pull 58 is movable along the distal edges 46 and the gap 44 from the zipped position to the unzipped position. Specifically, the zipper pull 58 is movable along the rows of teeth 54, 56 from the zipped position to the unzipped position. The zipper pull 58 may be used by the occupant or someone else to disconnect the first airbag 16 from the second airbag 18 to allow the occupant of the seat 14 to exit the seat 14. Specifically, the zipper pull 58 is moved along the rows of teeth 54, 56 to disengage the first row of teeth 54 from the second row of teeth 56 to disconnect the first airbag 16 from the second airbag 18.

When the airbags 16, 18 are in the inflated position and the zipper 20 is in the zipped position, the zipper pull 58 is spaced from the seatback 26. The zipper pull 58 is seat-forward of the seatback 26 when the airbags 16, 18 are in the inflated position and the zipper 20 is in the zipped position. Specifically, the occupant seating area 34 is between the zipper pull 58 and the seatback 26 when the airbags 16, 18 are in the inflated position and the zipper 20 is in the zipped position. In other words, the zipper pull 58 may be seat-forward of the occupant when the occupant is seated in the seat 14. In the event of an impact to the vehicle 12 and the airbags 16, 18 inflate to the inflated position, the zipper pull 58 may be moved along the first airbag 16 and the second airbag 18 by the occupant of the seat 14 or someone else to allow the occupant to exit the seat 14.

The zipper 20 may be any suitable type of zipper including, for example, known zippers. The zipper 20 is connected to the first airbag 16 and the second airbag 18 in any suitable way. For example, the zipper 20 may be sewn to the first airbag 16 and the second airbag 18. In other examples, the zipper 20 may be connected by adhesive or in other suitable ways. The connection between the zipper 20 and the airbags 16, 18 allows the airbags 16, 18 to control the kinematics of the occupant in the event of an impact and may be unzipped by the occupant or someone else to disconnect the airbags 16, 18 from each other.

As shown in FIGS. 3-6, the assembly 10 includes the non-inflatable panel 22 connected to the first airbag 16 and the second airbag 18. Specifically, the non-inflatable panel 22 is connected to the inner panels 52 of the first airbag 16 and the second airbag 18. In other words, the non-inflatable panel 22 is on the opposite panel of the airbags 16, 18 from the zipper 20. The first airbag 16 and the second airbag 18 are between the non-inflatable panel 22 and the zipper 20. The non-inflatable panel 22 extends along the cross-seat midline M when the first airbag 16 and the second airbag 18 are in the inflated position. In other examples, the non-inflatable panel 22 may be offset from the cross-seat midline M when the gap 44 is offset from the cross-seat midline M. The non-inflatable panel 22 extends along the gap 44 between the first airbag 16 and the second airbag 18 when the airbags 16, 18 are in the inflated position. The non-inflatable panel 22 overlaps the gap 44 between the first airbag 16 and the second airbag 18 in the inflated position.

The non-inflatable panel 22 extends along at least a portion of the zipper 20 extending along the gap 44. As shown in the example in the Figures, the non-inflatable panel 22 may be shorter in length than the zipper 20. In other words, as discussed above, both the non-inflatable panel 22 and the zipper 20 each extending along the gap 44 between the first airbag 16 and the second airbag 18. The non-inflatable panel 22 may be between the occupant seating area 34 and the zipper 20. In other words, the non-inflatable panel 22 may be between the occupant seated in the seat 14 and the zipper 20 to limit contact between the occupant and the zipper 20 in the event of an impact to the vehicle 12.

The occupant seating area 34 of the seat 14 may be between the non-inflatable panel 22 and the seat 14 when the airbags 16, 18 are in the inflated position. Specifically, the non-inflatable panel 22 may be seat-forward of the seatback 26 of the seat 14 when the airbags 16, 18 are in the inflated position. The non-inflatable panel 22 may extend along the gap 44 and in-front and/or upwardly of the occupant seated in the occupant seating area 34, i.e., seat-forward of the seatback 26.

The non-inflatable panel 22 extends from a proximate end 60 to a distal end 62 along the gap 44 between the first airbag 16 and the second airbag 18. The proximate end 60 of the non-inflatable panel 22 may be anchored relative to the seat 14. Specifically, the non-inflatable panel 22 may be connected to the first airbag 16 and the second airbag 18 by a stitch 64 at the proximate end 60. The distal end 62 may be connected to the seat 14 by the proximate end 60 of the non-inflatable panel 22. The distal end 62 of the non-inflatable panel 22 may be movable relative to the airbags 16, 18 and the seat 14 and the proximate end 60 is fixed relative to the seat 14.

The non-inflatable panel 22 may be releasably connected to one of the first airbag 16 or the second airbag 18 between the proximate end 60 and the distal end 62. Specifically, the non-inflatable panel 22 includes the releasable fastener 24 between the proximate end 60 and the distal end 62. The releasable fastener 24 may be releasably connected to one of the first airbag 16 or the second airbag 18. The releasable fastener 24 may be connected to one of the first airbag 16 or the second airbag 18 between the proximate end 60 and the distal end 62.

With reference to FIGS. 3-6, the non-inflatable panel 22 may include pairs of releasable fasteners 24, e.g., the non-inflatable panel 22 may include a second releasable fastener 24 connected to the other of the first airbag 16 or the second airbag 18 between the proximate end 60 and the distal end 62. The pairs of releasable fasteners 24 may be spaced cross-vehicle from each other and releasable connected to the first airbag 16 or the second airbag 18. Specifically, the releasable fasteners 24 may be connected to the inner panels 52 of the first airbag 16 and the second airbag 18. In other words, the releasable fasteners 24 may be spaced from each other across the gap 44 between the first airbag 16 and the second airbag 18 when the airbags 16, 18 are in the inflated positions.

The non-inflatable panel 22 may include any suitable number of releasable fasteners 24 spaced from each other along the gap 44 between the first airbag 16 and the second airbag 18 and on either side of the gap 44. The example shown in FIGS. 3, 4, and 6, the assembly 10 includes twelve releasable fasteners 24 along the gap 44, i.e., seven between the non-inflatable panel 22 and each of the first airbag 16 and the second airbag 18.

Figure 6:
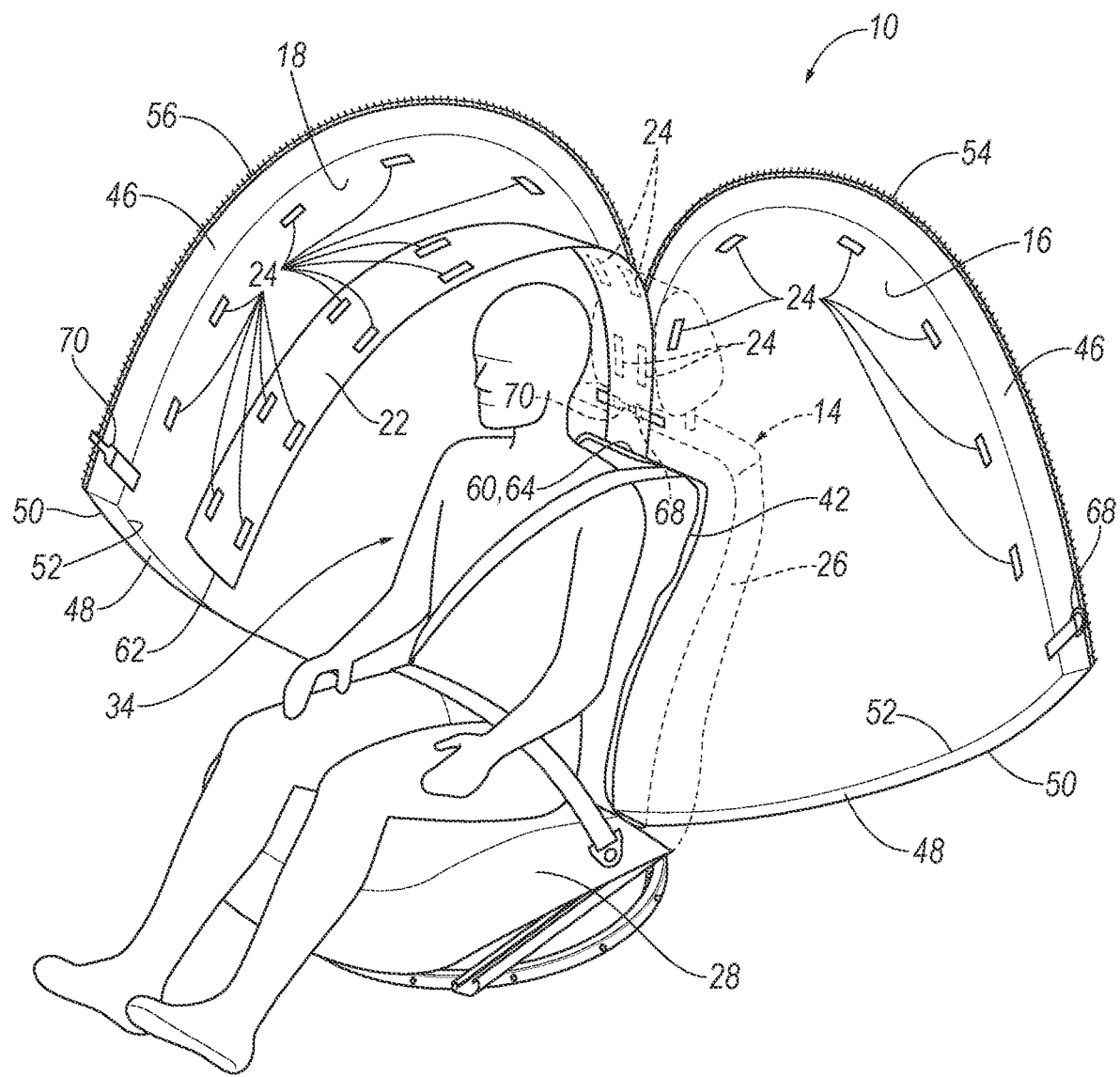
FIG. 6 is a perspective view of the seat with the zipper in an unzipped position.

In the example shown in FIG. 6, the releasable fasteners 24 may include hook and loop fasteners 66. In such an example, the hooks may be fixed to one of the airbags 16, 18 or the non-inflatable and the loops may be fixed to the other of the airbags 16, 18 or the non-inflatable panel 22. To release the non-inflatable panel 22 from the first airbag 16 and the second airbag 18, the hooks may be separated from the loops. In other examples, the releasable fasteners 24 may include snapping fasteners, e.g., plastic snapping fasteners. As with the hook and loop fasteners 66, the snapping fasteners allow the non-inflatable panel 22 to be releasable from the first airbag 16 and the second airbag 18.

The assembly 10 may include a ring 68 and hook 70 supported by the airbags 16, 18. Specifically, the hook 70 may be supported by one of the first airbag 16 and the second airbag 18 and the ring 68 may be supported by the other of the first airbag 16 and the second airbag 18. The hook 70 and the ring 68 may each be supported on the inner panel 52 of the airbags 16, 18. The hook 70 and the ring 68 may be between the non-inflatable panel 22 and the first airbag 16 and the second airbag 18. The hook 70 and the ring 68 may be between the zipper 20 and the non-inflatable panel 22. The non-inflatable panel 22 may be between the hooks 70 and ring 68 and the occupant seating area 34. In other words, the non-inflatable panel 22 limits contact between the hook 70 and ring 68 and the occupant of the seat 14.

The hook 70 may be releasably engaged with the ring 68 when the first airbag 16 and the second airbag 18 are in the inflated position. As the airbags 16, 18 move to the inflated position, the hook 70 being engaged with the ring 68 provides a component in addition to the zipper 20 to connect the airbags 16, 18. After the airbags 16, 18 have inflated to the inflated position, the hook 70 may be disengaged from the ring 68 to allow an occupant of the seat 14 to exit the vehicle. The hook 70 may be disengaged from the ring 68 prior to the occupant or someone else moving the zipper 20 to the unzipped position. For example, the hook 70 may include a tab (not numbered) that may be pushed by the occupant of the seat 14 to release the v from the ring 68.

The assembly 10 may include any suitable number of hooks 70 and rings 68. In the example shown in the Figures, the assembly 10 includes two pairs of hooks 70 and rings 68 spaced along the gap 44. One ring 68 and hook 70 is adjacent the proximate end of the non-inflatable panel 22 and one ring 68 and hook 70 is adjacent the distal end of the non-inflatable panel 22.

In the event of an impact to the vehicle 12, the occupant of the seat 14 may release the releasable fasteners 24 to move the non-inflatable panel 22 away from the gap 44 between the first airbag 16 and the second airbag 18. The occupant of the seat 14 may then release the hook 70 from the ring 68 and unzip the zipper 20 from the bottom surface 48 of the airbags 16, 18 and exit the seat 14 of the vehicle 12.

The airbags 16, 18 and non-inflatable panel 22 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The numerical adjectives "first" and "second" with respect to the airbags 16, 18 and the rows of teeth 54, 56 are used herein merely as identifiers and do not signify order or importance. The terms "first" and "second" may be used interchangeably when referring to the airbags 16, 18 as shown in the Figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
   a seat;
   a first airbag and a second airbag each supported by the seat and inflatable to an inflated position;
   a zipper releasably connecting the first airbag to the second airbag in the inflated position; and
   a non-inflatable panel connected to the first airbag and the second airbag, the non-inflatable panel having a releasable fastener releasably connected to one of the first airbag or the second airbag.

2. The assembly of claim 1, wherein the first airbag and the second airbag each extend from the seat to a distal edge, the zipper connecting the distal edge of the first airbag to the distal edge of the second airbag.

3. The assembly of claim 2, wherein the zipper includes a first row of teeth extending along the distal edge of the first airbag and a second row of teeth extending along the distal edge of the second airbag, the first row of teeth being engageable with the second row of teeth.

4. The assembly of claim 3, wherein the first row of teeth is engaged with the second row of teeth when the first airbag and the second airbag are in the inflated position.

5. The assembly of claim 2, wherein the zipper extends along the distal edges of the first airbag and the second airbag.

6. The assembly of claim 1, wherein the first airbag and the second airbag are between the zipper and the non-inflatable panel.

7. The assembly of claim 1, wherein the seat includes a seatback defining an occupant seating area, the first airbag and the second airbag surrounding the occupant seating area in the inflated position.

8. The assembly of claim 7, wherein the occupant seating area is between the zipper and the seatback.

9. The assembly of claim 7, wherein the first airbag and the second airbag include a bottom surface extending from the seatback and around the occupant seating area, the zipper extending from the seatback to the bottom surface.

10. The assembly of claim 7, wherein the first airbag and the second airbag each extend from the seatback and converge to a gap, the zipper extending along the gap.

11. The assembly of claim 7, wherein the zipper includes a zipper pull movable along the first airbag and the second airbag, the zipper pull being spaced from the seatback when the first airbag and the second airbag are in the inflated position.

12. The assembly of claim 11, wherein the zipper pull is seat-forward of the seatback when the first airbag and the second airbag are in the inflated position.

13. The assembly of claim 1, wherein the non-inflatable panel and the zipper extend along a cross-seat midline when the first airbag and the second airbag are in the inflated position.

14. The assembly of claim 1, wherein the first airbag and the second airbag each include an outer panel and an inner panel between the outer panel and the seat, the non-inflatable panel being connected to the inner panels of the first airbag and the second airbag and the zipper extending along the outer panels of the first airbag and the second airbag.

15. The assembly of claim 1, wherein the releasable fastener includes hook and loop fasteners.

16. The assembly of claim 1, wherein the non-inflatable panel includes a second releasable fastener releasably connected to the other of the first airbag or the second airbag.

17. The assembly of claim 1, wherein the non-inflatable panel is connected to the first airbag and the second airbag by a stitch.

18. The assembly of claim 1, further comprising a hook supported by one of the first airbag and the second airbag and a ring supported by the other of the first airbag and the second airbag, the hook being releasably engageable with the ring.

19. The assembly of claim 18, wherein the hook and the ring are between the non-inflatable panel and the first airbag and the second airbag.

20. The assembly of claim 18, wherein the hook and the ring are between the zipper and the non-inflatable panel.

\* \* \* \* \*